Aug. 25, 1942.  L. G. EHMANN  2,294,080
CONVEYER FLIGHT
Filed Sept. 21, 1940  2 Sheets-Sheet 1

LESLIE G. EHMANN
INVENTOR
BY
ATTORNEY

Aug. 25, 1942.　　　L. G. EHMANN　　　2,294,080
CONVEYER FLIGHT
Filed Sept. 21, 1940　　　2 Sheets-Sheet 2
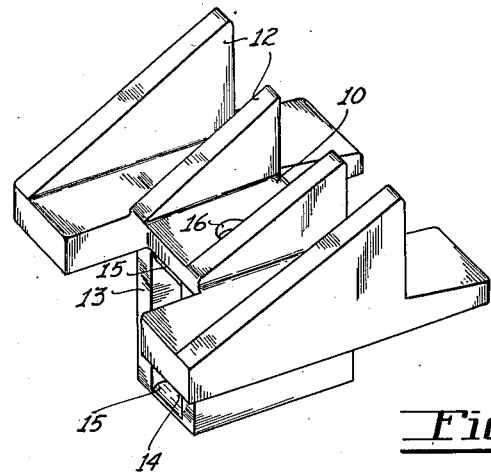
Fig. 7
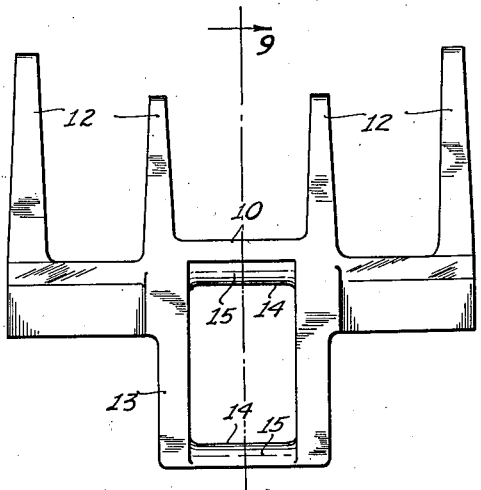
Fig. 8
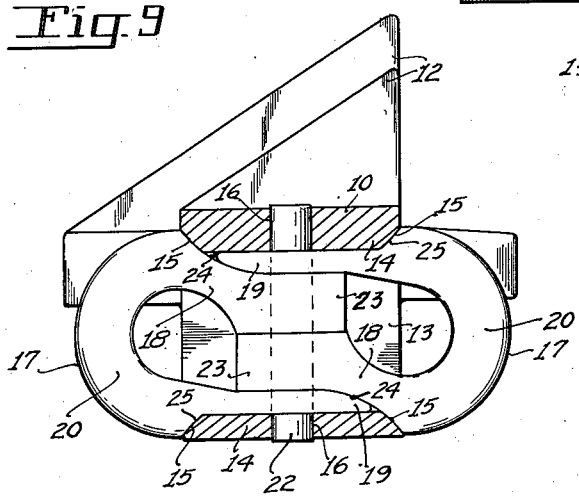
Fig. 9
LESLIE G EHMANN
INVENTOR.
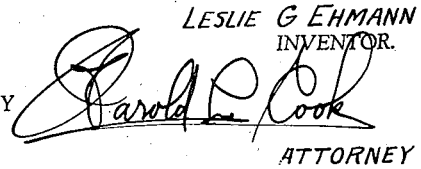
ATTORNEY Patented Aug. 25, 1942

2,294,080

UNITED STATES PATENT OFFICE 2,294,080

CONVEYER FLIGHT

Leslie G. Ehmann, Portland, Oreg., assignor to Electric Steel Foundry Company, Portland, Oreg., a corporation of Oregon Application September 21, 1940, Serial No. 357,719

11 Claims. (Cl. 198—176)

This invention relates to improvements in conveyers, and has particular reference to improvements in that type of flights which may be detachably mounted on conveyers for moving logs, slabs, sawdust, and in fact any material which can be dumped into a trough and moved therealong by operation of an endless chain.

It is an object of the invention to provide a flight for a conveyer which may be detachably mounted on a connecting link of a conveyer chain.

It is a further object of the invention to provide a conveyer flight designed to be mounted on a conveyer chain, and being of a novel structure whereby the load on the chain is not imparted to the flight.

It is a further object of the invention to provide a detachable flight for a conveyer chain which is easily installed and which is designed to withstand the most severe service.

To the accomplishment of the recited objects, and others coordinate therewith, the preferred embodiment of the invention resides in the construction and arrangement of parts hereinafter described, illustrated in the accompanying drawings, and embraced within the scope of the appended claims.

In the drawings:

Figure 7 is a perspective view of a conveyer flight of somewhat modified construction, embodying the principles of the invention.

Figure 8 is a front elevation of the flight illustrated in Figure 7, with the link removed.

Figure 9 is a sectional elevation of the conveyer flight taken on the line 9—9 of Figure 8, showing the manner of securing the flight to a connecting link.

Figure 2:
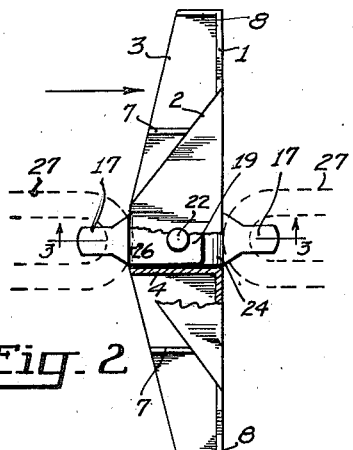
Figure 2 is a fragmentary plan view of a conveyer having a flight applied thereto. The arrow indicates the direction of travel.
Figure 1:
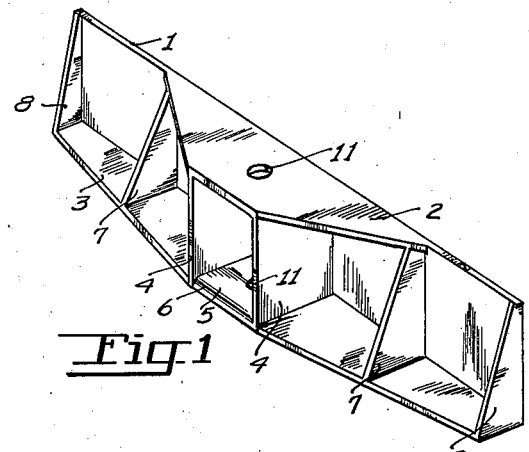
Figure 1 is a perspective view of a conveyer flight constructed in accordance with the principles of the present invention.
Figure 3:
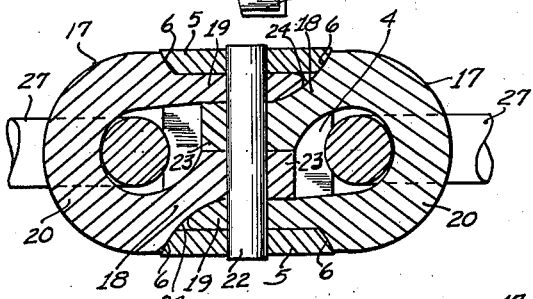
Figure 3 is an enlarged sectional elevation of the conveyer, taken on the line 3—3 of Figure 2.
Figure 6:
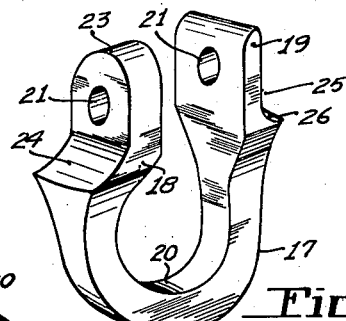
Figure 6 is a perspective view of one of the U-shaped members comprising the link.

Referring to Figures 1, 2, 3, 4 and 5 of the drawings, the invention is illustrated as embodied in a conveyer flight made in the form of a bar of channel iron having a vertical front wall 1 and horizontal top and bottom flanges 2 and 3 extending rearwardly from the upper and lower edges of the vertical wall. The bottom flange 3 extends the full length of the bar, whereas the ends of the top flange 2 merge with the front wall 1 at points midway between the center and the ends of the flight. The flight is open on its rearward side. Centrally of the flight there is an unbroken, box-like structure having a continuous wall comprising side walls formed by spaced webs 4—4 disposed transversely of the bar, and top and bottom walls formed by the top and bottom horizontal flanges 2 and 3, the webs and horizontal flanges being integrally joined. The box-like structure is open at both ends, the front wall 1 of the flight being cut away within the area defined by the walls of the box. On two sides 5—5 of the box-like structure the walls are of greater thickness than on the other two sides, the ends 6—6 of which receive the thrust imposed by movement of the link. Aligned openings 11—11 in the sides 5 provide access to the connecting pin 22 for the link members. Intermediate each of the webs 4—4 and the adjacent end of the flight is a bracing web 7 interconnecting the top and bottom flanges 2 and 3 and the front wall 1. The ends of the flight are closed by webs 8—8 interconnecting the bottom flange 3 and the front wall 1.

Figure 5:
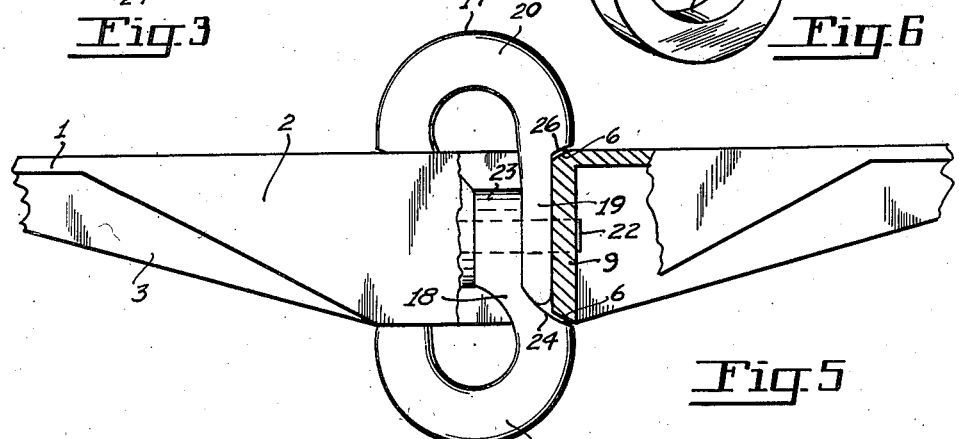
Figure 5 is a fragmentary plan view of a conveyer flight illustrating the modification of structure necessary to apply the flight to a horizontal link.
Figure 4:
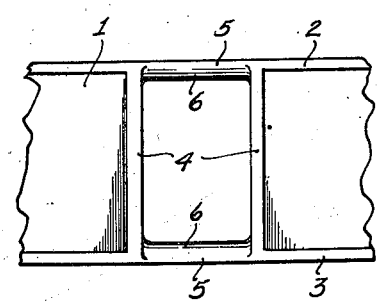
Figure 4 is a fragmentary front elevation of a conveyer flight, illustrating the construction of the structure for securing the flight to the chain.

Figures 1, 2, 3 and 4 illustrate a flight adapted to be applied perpendicular to the plane of the link. Figure 5 illustrates a flight adapted to be applied parallel to the plane of the link. The flight illustrated in Figure 5 is similar in construction to that illustrated in Figure 1, except that the transverse webs forming the side walls of the box-like structure at the center of the flight are of greater thickness than the top and bottom walls of said structure, and the aligned openings 11—11 are in changed position. In this construction the transverse webs 9—9 engage in the recesses 25 at the sides of the link, whereas in Figures 1, 2, 3 and 4, the sides 5—5 engage in the recesses 25 in the sides of the link.

Figures 7, 8 and 9 illustrate the invention as embodied in a type of conveyer flight commonly referred to as a log haul chair, comprising a horizontally disposed bar 10 having prongs 12 cast integrally therewith for engaging and supporting a log carried thereon. The length of the log haul chair is intended to be that direction parallel to the conveyer chain, and in this direction the measurement of the chair is approximately equal to the length of the connecting link to which it is applied. For applying the flight to a chain link the bar 10 is provided at its center with a box-like structure 13, open at both ends, the top and bottom walls 14 having ends 15 for receiving the thrust imposed by movement of the link. Aligned openings 16 in the walls 14 permit insertion and removal of the connecting pin 22 for the link members 17.

The link for connecting the flight to a chain is composed of identical members 17—17, each of which is structurally designed as a hook having a shank 18 and an end portion 19 defining a load supporting eye 20. The shank 18 and the end portion 19 are provided with aligned openings 21 for receiving a pin 22. The structure just described constitutes U-shaped members which together form a link in the conveyer chain upon which the conveyer flight is mounted. It will be noted that the shank 18 constituting one of the arms of each U-shaped member 17 is of substantially greater cross section than the other arm or end portion 19. It is also noted that the end 23 of the shank 18 is deformed or offset towards the other arm. Thus the end 23 of the shank 18 is positioned approximately in the line of tension when the link is loaded. The offset end portion 23 of the shank provides a recess 24 of a size which will accommodate the end portion 19 of the companion member. Thus the two members fit together in smooth, symmetrical relationship, with the large arms or shank portions 18 approximately in the line of tension when the link is loaded, and with the smaller arms 19 in overlapping relation to the large arms or shanks 18.

It will be seen that the two large end portions 23 bear upon the central portion of the pin, and that the end portions 19 bear upon the end portions of the pin, and that the four arms collectively have bearing upon substantially the full length of the pin. In assembled relation the U-shaped members overlap on the pin 22 so that the large end portions 23 form a continuous support between the respective outer arms 19. This support strengthens the link in the same manner as does the web commonly employed on large solid links by preventing deforming of the link when subjected to extreme tension.

Each of the respective outer arms 19 of the assembled link is laterally recessed or rabbeted as at 25, whereby in the assembled link the ends of each recessed portion 25 form parallel shoulders 26. At their end portions each of the arms of the U-shaped members 17 is somewhat flattened, and the middle portion of the assembled link is rectangular in shape, so that it fits snugly within the box-like structure on the conveyer flight.

The oppositely disposed sides of the box-like structure on the flight are of a length substantially equal to the length of the indented recesses 25—25 in the sides of the link, so as to be received therewithin, and the ends 6 (or 15) thereof seat against the shoulders 26 of the link and receive the thrust imposed by movement thereof.

To attach the flight to a conveyer chain the U-shaped members 17—17 are caused to engage the solid links 27 at the ends of adjacent sections of the conveyer, and the arms of the U-shaped members are inserted into the box-like structure on the flight from opposite sides of the flight. When the openings 21 in the ends of the arms 18 and 19 are in alignment with the openings 11 (or 16) in the walls of the box, the pin 22 is inserted therethrough and riveted or otherwise secured in place. To remove the flight from the conveyer it is necessary only to remove the connecting pin 22, thus causing the U-shaped members to become disconnected, whereupon these members may be withdrawn from engagement with the flight.

An advantage of the construction hereinabove described is that none of the load on the conveyer chain is imparted to the flight, the flight serving merely to move its own load of material as the conveyer moves. Since the flight forms no part of the conveyer chain, damage to the flight does not interrupt operation of the conveyer, as would be the case in those constructions where the flight serves as a connecting link between adjacent sections of the conveyer chain. Moreover, the time required for replacement of damaged parts is materially shortened, and the desired security and rigidity of connection is accomplished.

Having now described my invention and in what manner the same may be used, what I claim as new and desire to protect by Letters Patent is:

1. An attachment for a conveyer chain, comprising a pair of opposed U-shaped members, each of said members having two arms and aligned openings in the ends of said arms, a pin through said openings to connect said pair of members together to form a link, and a conveyer member mounted on said link, the mid-section of said conveyer member comprising a box-like structure having a continuous wall open at both ends adapted to engage around the middle portion of said link, the sides of said link being rabbeted to form lateral recesses, opposite walls of said box being received within said recesses.

2. An attachment for a conveyer chain, comprising a pair of U-shaped members, each of said members having two arms and aligned openings in the ends of said arms, a pin through said openings to connect said pair of members together to form a link, recesses formed in the sides of said link and forming shoulders at the ends of said recesses, and a conveyer member mounted on said link, the mid-section of said member comprising an unbroken section having a continuous wall engaging around said link and abutting said shoulders in load supporting engagement therewith.

3. An attachment for a conveyer chain, comprising a pair of U-shaped members having aligned openings, a pin through said openings to connect said members together to form a link, longitudinally spaced parallel shoulders on each side of said link, and a conveyer member mounted on said link and having a box-like structure having a continuous wall open at both ends and adapted to engage around the middle section of the link, the ends of the walls of said structure engaging said shoulders for receiving the thrust imposed by movement of said link.

4. A chain attachment comprising a pair of U-shaped members, each of said members having two arms and aligned openings in the ends of said arms, one arm on each member being deflected inwardly of said U, a pin through said openings to connect said pair of members together to form a link, said members being arranged on said pin with the arms of the two members in alternate relationship with the inwardly deflected arms between the non-deflected arms, the non-deflected arm of each member being rabbeted to form a shouldered recess in the outer surface thereof, a conveyer member mounted on said link having a box-like portion having a continuous wall engaging around the middle portion of said link, the ends of opposite walls of said box being seated in said recesses for receiving the thrust imposed by movement of said link.

5. A chain attachment comprising a conveyer member having an unbroken structure having a continuous wall open at both ends, a pair of U-shaped members, each of said members having two arms and aligned openings in the ends of said arms, one arm of each member being rabbeted to form a shouldered recess therein, said U-shaped members being insertable into said unbroken structure in opposed relation to bring all of said openings into alignment and the wall of said structure into seated engagement with the shoulders on said U-shaped members, and a pin insertable through said openings to connect said pair of members together.

6. An attachment for a conveyer chain, comprising a pair of U-shaped members having aligned openings, a pin through said openings to connect said members together to form a link, longitudinally spaced parallel shoulders on each side of said link, and a conveyer member mounted on said link comprising a bar having a plurality of prongs perpendicular to said bar forming a log chair, the mid-portion of said member comprising an unbroken section having a continuous wall and being open at both ends for receiving therethrough the mid-portion of the chain link, the ends of said wall engaging said shoulders for receiving the thrust imposed by movement of said link.

7. An attachment for a conveyer chain, comprising a conveyer member, the mid-section of said member comprising a box-like structure having a continuous wall and being open at both ends for receiving therethrough the mid-portion of a chain link; a chain link adapted to be received within said box-like structure, comprising a pair of opposed U-shaped members, each of said members having two arms and aligned openings in the ends of said arms, a pin insertable through said openings to connect said pair of members together to form a link, the U-shaped members comprising said link being insertable into said box-like structure from opposite ends thereof and secured therein by insertion of said pin through said aligned openings.

8. An attachment for a conveyer chain, comprising a conveyer member, the mid-section of said member comprising a box-like structure having a continuous wall and being open at both ends for receiving therethrough the mid-portion of a chain link; a chain link adapted to be received within said box-like structure, comprising a pair of opposed U-shaped members, each of said members having two arms and aligned openings in the ends of said arms, a pin insertable through said openings to connect said pair of members together to form a link, one arm of each U-shaped member being recessed whereby in the assembled link and conveyer member opposite walls of said box-like structure are received within said recesses, the U-shaped members comprising said link being insertable into said box-like structure from opposite ends thereof and secured therein by insertion of said pin through said aligned openings.

9. A conveyer flight adapted to be mounted on a chain link, said flight comprising a front wall, rearwardly extending flanges integral with the upper and lower edge portions of said wall, a pair of parallel spaced apart webs extending rearwardly from said front wall and integral with said front wall and said flanges, an opening through said front wall between said webs of a width corresponding substantially to the spacing between said webs, said webs and upper and lower flange portions extending therebetween defining a substantially rectangular opening for cooperatively receiving a chain link.

10. A conveyer flight adapted to be mounted on a chain link, said flight comprising a front wall, spaced apart parallel flanges integral with and extending perpendicularly from said front wall, a pair of spaced apart webs integral with and extending perpendicularly between said flanges, said webs being integral with and extending perpendicularly with respect to said front wall, an opening through said front wall between said flanges and said webs, said webs and said flange portions extending therebetween defining an elongated rectangular opening for cooperatively receiving a chain link, inner edge portions at the opposite ends of said elongated rectangular opening defining bearing surfaces for cooperatively engaging shoulders on a chain link arranged therewithin.

11. An attachment for a conveyer chain comprising a load engaging member adapted to extend at substantially right angles with respect to said chain, said member having a pair of substantially parallel and spaced apart webs integral therewith, a pair of substantially parallel and spaced apart walls extending perpendicularly between said webs and integral therewith at the opposite ends thereof, means comprising said webs and said walls defining an elongated rectangular opening for cooperatively receiving in a surrounding relation the mid section of a conveyer chain link, edges of said means at the opposite ends of said elongated rectangular opening defining shoulders for bearing in a load supporting engagement against cooperating shoulders on a link arranged therewithin.

LESLIE G. EHMANN.